(12) United States Patent
Wang (10) Patent No.: US 7,844,112 B2
(45) Date of Patent: Nov. 30, 2010

(54) DEVICE AND METHOD FOR ENHANCING IMAGE CONTRAST

(75) Inventor: Dongjian Wang, Shanghai (CN)

(73) Assignee: Pixelworks, Inc., Portland, OR (US)

( * ) Notice: Subject to any disclaimer, the term of this patent is extended or adjusted under 35 U.S.C. 154(b) by 974 days.

(21) Appl. No.: 11/470,221

(22) Filed: Sep. 5, 2006

(65) Prior Publication Data

US 2007/0071345 A1   Mar. 29, 2007

(51) Int. Cl.
*G06K 9/00* (2006.01)
(52) U.S. Cl. .................................... 382/168; 382/274
(58) Field of Classification Search .............. 382/168, 382/274
See application file for complete search history.

(56) References Cited

U.S. PATENT DOCUMENTS

| 5,727,080 | A | * | 3/1998 | Cox et al. | 382/168 |
| 5,808,697 | A | * | 9/1998 | Fujimura et al. | 348/672 |
| 5,937,090 | A | * | 8/1999 | Kim | 382/169 |
| 5,963,665 | A | * | 10/1999 | Kim et al. | 382/169 |
| 6,148,103 | A | * | 11/2000 | Nenonen | 382/169 |
| 6,285,798 | B1 | * | 9/2001 | Lee | 382/260 |
| 6,850,642 | B1 | * | 2/2005 | Wang | 382/169 |
| 7,174,049 | B2 | * | 2/2007 | Bhattacharjya | 382/274 |
| 7,424,148 | B2 | * | 9/2008 | Goh | 382/169 |
| 7,433,536 | B2 | * | 10/2008 | Kim | 382/266 |
| 2001/0046320 | A1 | * | 11/2001 | Nenonen et al. | 382/169 |
| 2002/0171852 | A1 | * | 11/2002 | Zhang et al. | 358/1.9 |

\* cited by examiner

*Primary Examiner*—Brian Q Le
*Assistant Examiner*—Jayesh Patel
(74) *Attorney, Agent, or Firm*—Marger Johnson & McCollom PC (57) ABSTRACT

We describe a device that dynamically increases the contrast of the effective gray level based on the gray level distribution of serial images, performs soft-transfer of dynamic contrast adjustment curve when a scene switch occurs thereby realizing adaptive contrast enhancing while effectively avoiding image flicker. A device and associated method for enhancing image contrast includes a gray level distribution statistic circuit to calculate gray level statistic data of an image responsive to an image brightness signal. An adaptive contrast mapping curve calculation circuit calculates a gray level mapping curve responsive to the gray level statistic data. An inter-frame curve soft-merging circuit performs inter-frame soft-merging to the gray level mapping curve. And a gray level mapping circuit performs gray level mapping of the input image brightness signal.

13 Claims, 6 Drawing Sheets

DEVICE AND METHOD FOR ENHANCING IMAGE CONTRAST

This application claims the priority of Chinese Patent Application No. 2005 1 0029731 filed on Sep. 5, 2005, in the China Intellectual Property Office, the disclosure of which we incorporate here in its entirety by reference.

FIELD

The present application describes a device and method for enhancing image contrast and, more particularly to a device and method for adaptively enhancing video image contrast for effectively avoiding flicker.

BACKGROUND

As a need for media quality increases, the contrast of a video image becomes an important index of many electronic video devices. Same display devices include a manual video contrast adjustment: manually increasing the slope of the gray level mapping curve of certain fixed gray area to enhance the contrast of certain gray level. This manual adjustment inevitably results in the reduction of the contrast of other gray levels. When the gray level of video data distributes in the reduced gray levels, the contrast actually decreases, even the gray level would be combined.

Using several gray level mapping curves is often applied to dynamically adjust the contrast of video image according to the video image itself. First, the gray level mapping curve is determined according to the image's gray statistic data and scene detect signal gray level mapping is performed to the image for dynamically adjusting contrast. But this method has some defects: when there are tiny changes in gray distribution of scenes, the scene detect signal will switch in different modes in high frequency, which will leads to undesirable image flicker and using predetermined mapping curves limits the dynamic adjustment range and is costly because of the costs associated with storing the mapping grid.

SUMMARY

We describe a device for enhancing image contrast that can dynamically increase the contrast of effective gray levels based on gray level distribution of serial images and that can soft-transfer the dynamic contrast adjusting curve when scenes switch thereby effectively preventing image flicker during adaptive dynamic contrast enhancement.

And we describe a method for enhancing image contrast that can dynamically increase the contrast of effective gray levels based on the gray level distribution of serial images and that can soft-transfer the dynamic contrast adjusting curve when scenes switch thereby effectively preventing image flicker during adaptive dynamic contrast enhancement.

DETAILED DESCRIPTION

Exemplary Embodiment 1

Figure 1:
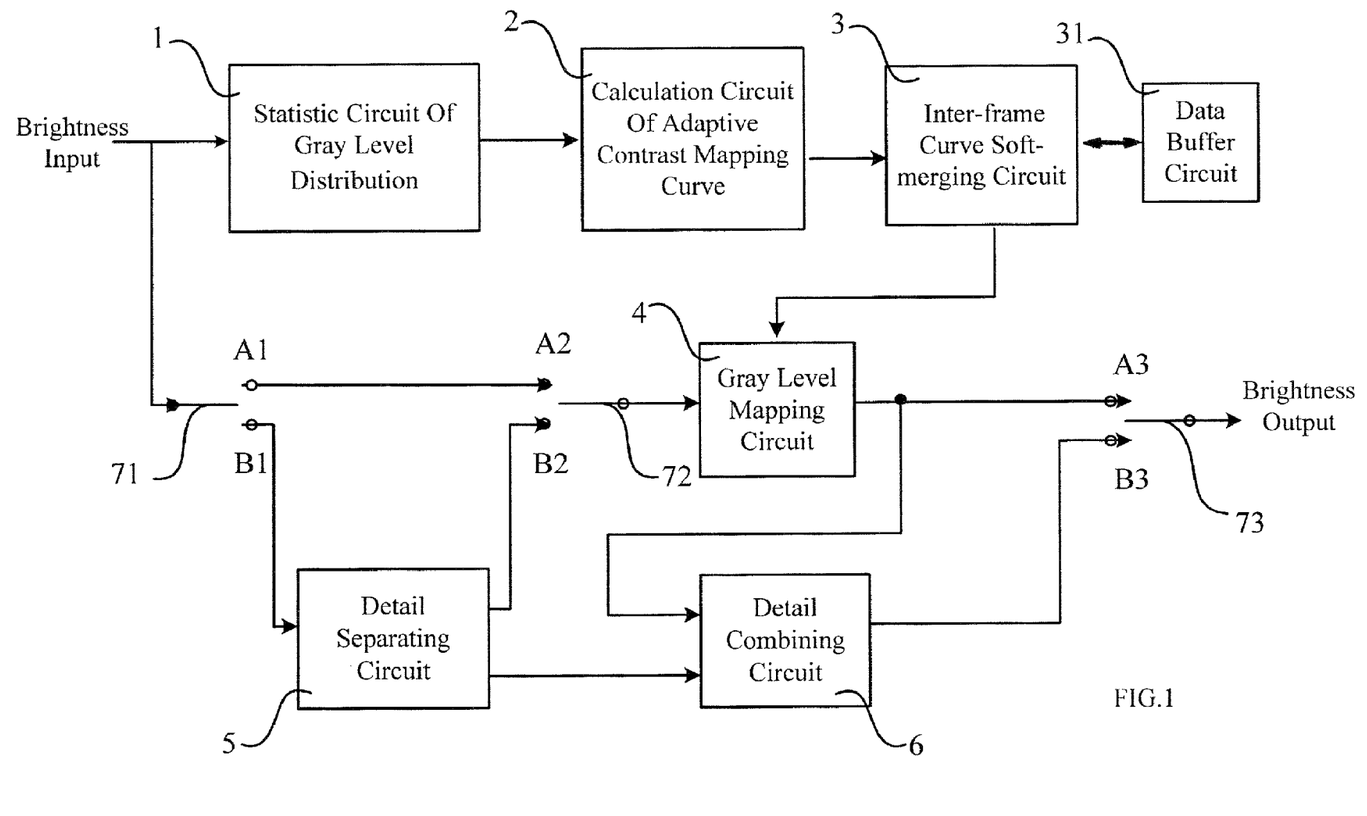
FIG. 1 is a block diagram of device for enhancing image contrast.

Referring to FIG. 1, a device for image enhancing includes a gray level distribution statistical circuit of 1. A mapping curve calculation circuit 2 is coupled to the gray level distribution statistical circuit 1. An inter-frame curve soft-merging circuit 3 is coupled to the mapping curve calculation circuit of adaptive contrast mapping curve 2. A data buffer circuit 31 is coupled to the inter-frame curve soft-merge circuit 3. A gray level mapping circuit 4 is coupled to the inter-frame curve soft-merging circuit 3. A first selecting switch 71 is coupled to a detail separating circuit 5. A second selecting switch 72 is coupled to the first selecting switch 71, the detail separating circuit 5, and the gray level mapping circuit 4. A detail combining circuit 6 is coupled to the detail separating circuit 5 and the gray level mapping circuit 4. A third selecting switch 73 is coupled to the detail combining circuit 4 and the gray level mapping circuit 6.

The gray level distribution statistic circuit 1 receives an image brightness signal and calculates gray level statistic data responsive to the image brightness signal. The mapping curve calculation circuit 2 calculates a gray level mapping curve. The inter-frame curve soft-merging circuit 3 performs inter-frame soft-merging to the gray level mapping curves received from the calculation circuit 2. The gray level mapping circuit 4 performs gray level mapping of the input image brightness signal. The detail separating circuit 5 separates the input image brightness signal into a detail signal and a non-detail signal. The detail separating circuit 6 provides the detail signal to the detail combing circuits. And the detail separating circuit 6 provides the non-detail signals to the second switch 72. The first selecting switch 71 routes the brightness signal through the detail separating circuits. Alternatively, the first selecting switch 71 bypasses the detail separating circuits 5 providing the brightness signal directly to the gray level mapping circuit 4 through the second selecting switch 72. The detail combining circuit 6 combines the detail signal with non-detail signal processed by the gray level mapping circuit 4. The second selecting switch 72 selects either the brightness signal or the non-detail signal from the detail separating circuit 5 as the input signal to the gray level mapping circuit 4. The second selecting switch 72 operates responsive to the first selecting switch 71. The third selecting switch 73 selects either the non-detail signal processed by the gray level mapping circuit 4 or the combined signal output from the detail combining circuit 6 as the response to output signal responsive to the first selecting switch 71. When the first selecting switch 71 contacts terminal A1 electing to bypass the detail separating circuit 5, the second selecting switch 72 correspondingly contacts terminal A2 thereby choosing the image brightness signal as the input signal of the gray level mapping circuit 4 and the third selecting switch 73 correspondingly contacts terminal A3 thereby choosing the output signal of the gray level mapping circuit 4 as the output brightness signal. Alternatively, when the first selecting switch 71 switches to terminal B1, providing the brightness signal to the detail separating circuit 5 the second selecting switch 72 contact terminal B2 thereby providing the non-detail signal outputted by detail separating circuit 5 as the input signal to the gray level mapping circuit 4 and the third selected switch correspondingly contacts terminal B3 to choose the output signal of the detail combining circuit 6 as the output brightness signal.

Figure 2:
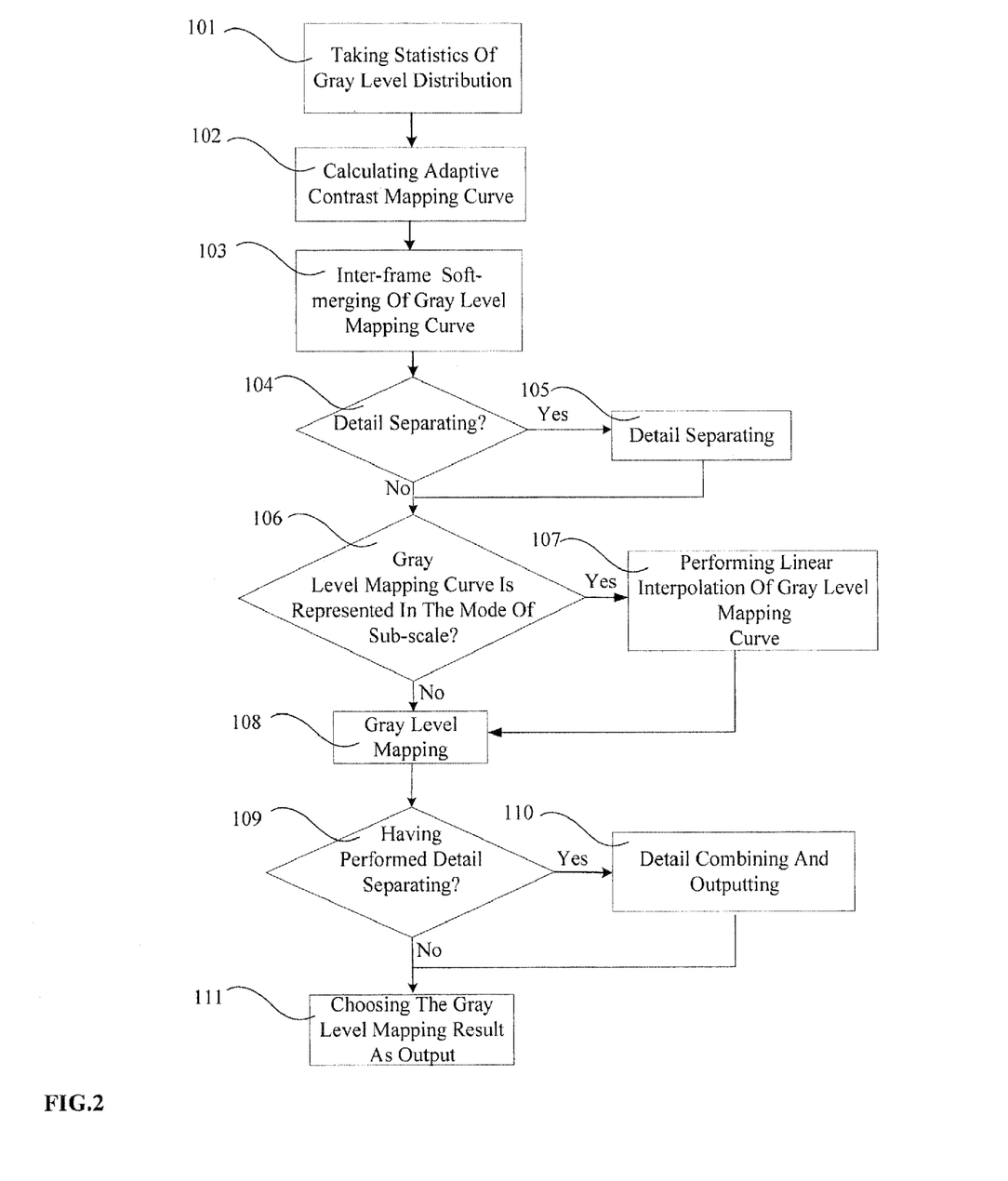
FIG. 2 is a flow chart of a method for enhancing image contrast.

FIG. 2 is a flowchart of a method for enhancing image contrast. Referring to FIG. 2, at 101, the method takes, calculates, or otherwise generates histogram statistics of the brightness signal. The histogram statistics may be of the whole or specific area of the image frame sample.

The gray level Y of the actual input brightness signal may be in the range of an exemplary method of calculating the histogram statistics includes defining L=8 as the bit width of data, performing normalizing, and obtaining the corresponding histogram distribution function f(n), n=0, 1, ... N, where N is the quantized histogram columns number, for instance N=64. The method then calculates the center of gravity of the gray distribution, e.g., the column $n_G$, the first moment located at and the variance of the gray distribution representing the dispreading of the distribution, e.g., the second moment $\sigma^2$.

Referring back to FIG. 2., the method adaptively and dynamically calculates the equivalent gray level mapping curve of the image brightness signal at 102 based on the gray statistic data. The method provides the gray level mapping curve of the current frame to the inter-frame curve soft-merging circuit for further processing.

An exemplary method of calculating the gray level mapping curve includes calculating the cumulative density function $$F(n) = \sum_{k=0 \sim n} f(k),$$

where k=0, 1, ..., N from f(n) using the transformation of the cumulating density function H(n)=γ(n)·(F(n)−M(n)) as a mapping curve, where γ(n) is the gain of every gray level interval. For instance:

$$\gamma(n) = \begin{cases} 1.0 & n < 10 \\ 1 - (n-10)/22 & n \geq 10 \end{cases}$$

where M(n) is the compensate curve of the whole image brightness.

For instance:

$$M(n) = \begin{cases} n \cdot (a/n_0) & n < n_0, a \in (0, 1023) \\ 1023 - (N - i) \cdot (1023 - a)/(N - n_0) & n \geq n_0 \end{cases}$$

where $n_0$ is the gray level interval at the center of histogram. The simple form may be M(n)=1023·n/N;

Another exemplary method of calculating the gray level mapping curve includes calculating H(n)=M(n)+k·Δ(f(n), $n_G$, $\sigma^2$) where M(n) is the compensate curve of the whole image brightness and where $$\Delta(f(n), n_G, \sigma^2) = \sum_{i=1,\ldots m} \lambda_i \Delta_i.$$

$n_G$ and $\rho^2$ are the first and second moments of the gray distribution of the image calculated in 101 and $\Delta_i$ (i=1, ..., m−1) are the cosine like curves to be selected from with the period of 2N, N, N/2, N/4, ..., For example, $\Delta_1(n)=\sin(n/2N*2\pi)$, $\Delta_2(n)=-\sin(n/N*2\pi)$ and so on. $\Delta_m$ is a curve calculated dynamically with a cross-zero point near $n_G$, for example, half period of sine curve at both sides of the cross-zero point $\lambda_i$ is the weight of every curve.

Figure 3:
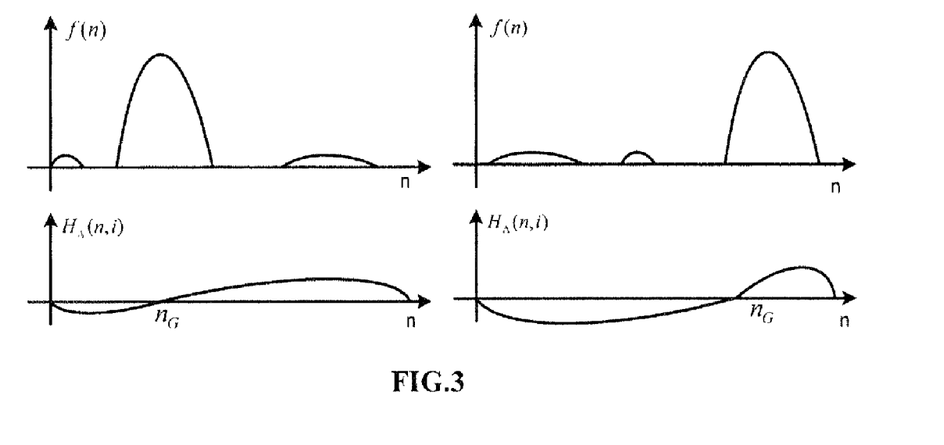
FIG. 3 is a histogram distribution graph and its corresponding gray level mapping curve.

H(n) may be the gray level mapping curve result of the current frame, while the equivalent expression $H_A(n)$=F(n)−M(n) may be the equivalent gray level mapping curve, the curves of f(n) and $H_A(n)$ are shown in FIG. 3.

At 103, the method soft-merges the gray level mapping curve of the current frame and the soft-merging result of the previous frame stored in a data buffer circuit. The method obtains the soft-merging result of the current frame outputs the soft-merging result of the current frame to the gray level mapping circuit, and stores the result in the data buffer circuit.

Figure 4:
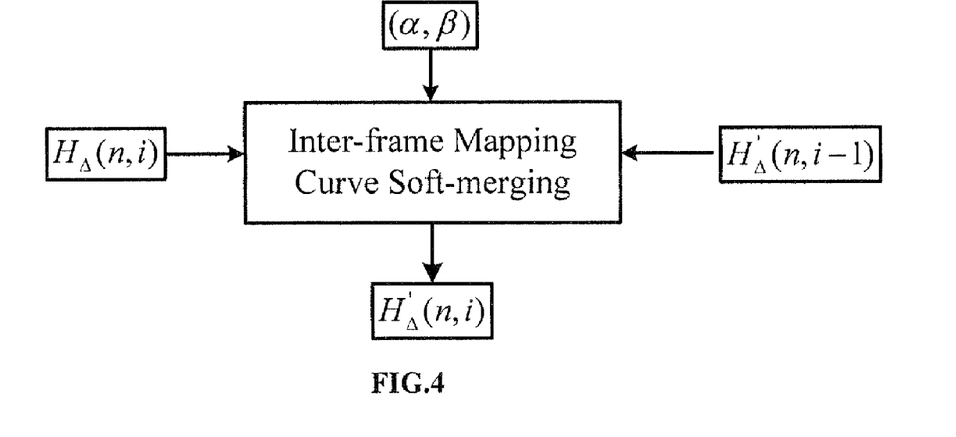
FIG. 4 is a block diagram of an inter-frame curve soft-merging circuit.

An exemplary method for soft-merging is shown in FIG. 4 an includes soft-merging the calculated equivalent gray level mapping curve $H_A(n,i)$ of current frame i and the calculation result of the previous frame (i−1), and controlling the weight of soft-merging by using parameters α and β.

$$H_A'(n,i)=\{\alpha \cdot H_A(n,i)+\beta \cdot H_A'(n,i-1)\}/(\alpha+\beta)$$

The method compares α with β. The bigger α, the more the mapping curve calculated with the current frame account for in merging, the smaller α, the less. The choice of parameters α and β may be associated with the sensitivity of human eye. In one example, as long as a α/(α+β)≦1/16, the human eye cannot perceive inconsecutive merging.

At 104, a user may choose to detail separate through the first selecting switch. If the user elects detail separation, the method moves to 105, otherwise the method selects the image brightness signal as the input of gray level mapping circuit through the second selecting switch 72 at 106.

At 105, the method separates the detail signal from image brightness signal, outputs the detail signal to the detail combining circuit and outputs the non-detail signal to the second selecting switch 72. The second selecting switch 72 selects the non-detail signal as the input signal to the gray level mapping circuit 4.

At 106, the gray level mapping circuit 4 determines whether the gray level mapping curve of the current frame is represented in a sub-scale mode. If so, the method moves to 107. Otherwise, it is represented in an all-scale mode and the method moves to 108.

At 107, the method performs linear interpolation and smooth filtering, and takes the result as the soft-merging result of the current frame.

At 108, the method performs gray level mapping to the input signal based on the soft-merging result of the current frame, and outputs the result of gray level mapping to the third selecting switch 73 and detail combining circuit.

At 109, the method determines whether detail separating is performed based on the status of the first selecting switch 71. If so, the method moves to 110. Otherwise, the method moves to 111.

At 110, the method combines the result of gray level mapping with the detail signal and selects the combined signal as the output brightness signal through the third selecting switch 73.

At 111, the method selects the gray level mapping result as the output brightness signal.

We have described a circuit that effectively and dynamically increases the contrast of the gray level based on the gray level distribution of serial images by soft-merging equivalent gray level mapping curves.

Exemplary Embodiment 2

We now describe an alternative embodiment. This embodiment considers other signal components such as the distribution of saturation component and scene switching.

Figure 5:
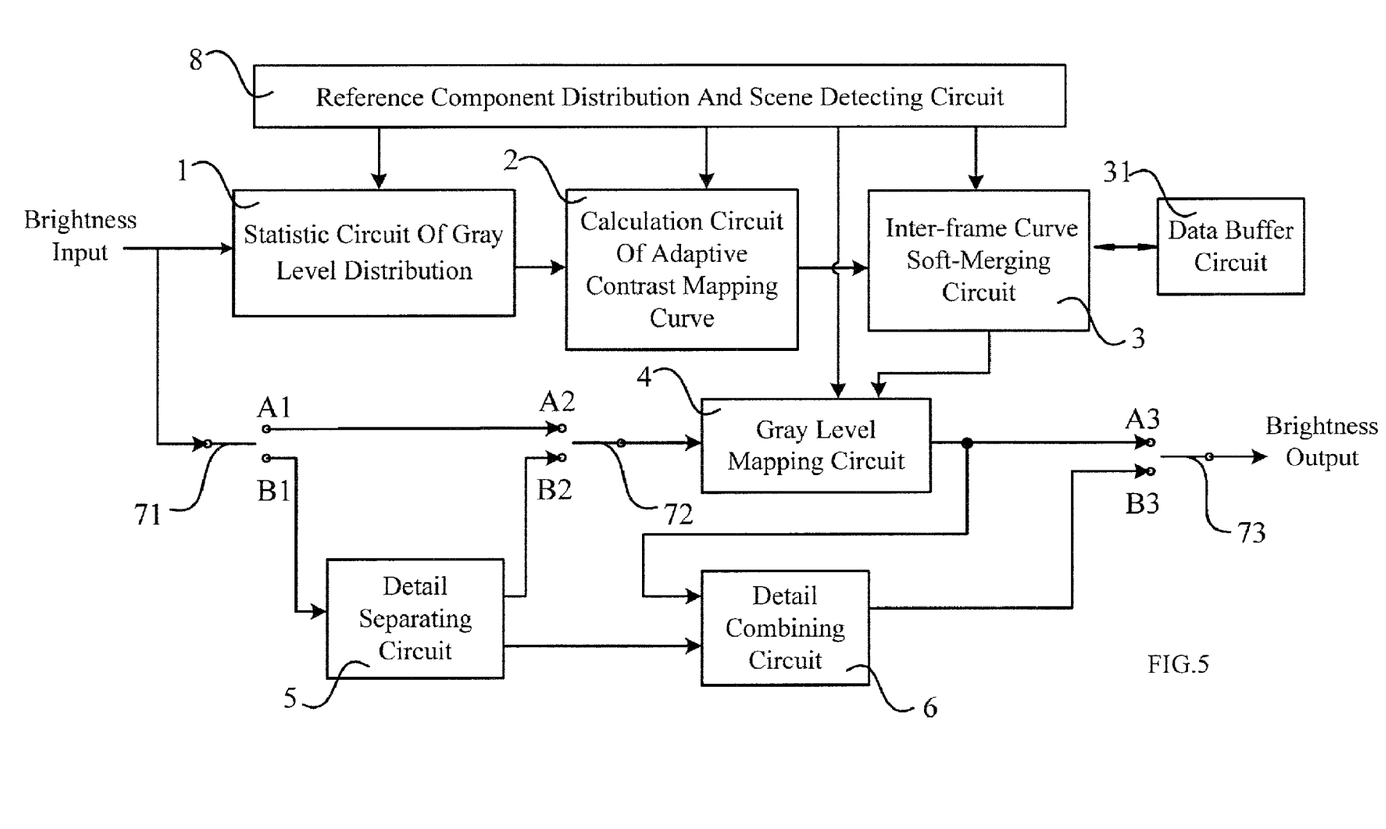
FIG. 5 is a block diagram of a device for enhancing image contrast.

As showed in FIG. 5, the differences between embodiment 2 and embodiment 1 includes a reference component distribution and scene detecting circuit 8. The component distribution and scene detecting circuit 8 is coupled to the gray level distribution statistic circuit 1, the mapping curve calculation circuit 2, the inter-frame curve soft-merging circuit 3, and the gray level mapping circuit 4.

The reference component distribution and scene detecting circuit 8 is adapted to provide of color saturation component information and a scene switching detect signal to the gray level distribution statistic circuit 1, the mapping curve calculation circuit 2, the inter-frame curve soft-merging circuit 3, and the gray level mapping circuit 4.

The gray level distribution statistic circuit 1 receives the image brightness signal and calculates gray level statistic data responsive to the color saturation component. The mapping curve calculation circuit 2 calculates a scene switching gain coefficient based on the scene switching detect signal, and calculates the gray level mapping curve according to the gray level statistic data. The mapping curve calculation circuit 2 multiplies the curve by a gain coefficient to obtain a gray level mapping curve with scene switching. The inter-frame curve soft-merging circuit 3 calculates the control parameters for soft-merging according to the scene detect signal and performs inter-frame soft-merging to the gray level mapping curve. The data buffer circuit 31 stores the soft-merging result of the previous frame. The gray level mapping circuit 4 performs gray level mapping of input signal according to the inter-frame soft-merging result and the color saturation component. The first selecting switch 71 selects to route the brightness signal to the detail separating circuit 5 or bypasses the circuit 5, providing the brightness signal directly to the gray level mapping circuit 4 through the second selecting switch 72. The detail separating circuit 5 separates the input image brightness signal into the detail signal and the non-detail signal. The second selecting switch 72 selects the input signal of the gray level mapping circuit 4 according to the first selecting switch 71. The detail combining circuit 6 combines the detail signal with non-detail signal processed by the gray level mapping circuit 4. The third selecting switch 73 selects the output signal according to the first selecting switch 71. When the first selected switch 71 contacts terminal A1, electing to bypass the detail separating circuit 5, the second selected switch 72 contacts terminal A2 to select the image brightness signal as the input signal of the gray level mapping circuit 4 and the third selected switch 73 correspondingly contacts terminal A3 to select the brightness output of the gray level mapping circuit 4 as the output brightness signal. Alternatively, when the first selecting switch 71 contacts terminal B1, electing to provide the brightness signal to the detail separating circuit 5, the second selecting switch 72 contacts terminal B2 to select the non-detail signal outputted by detail separating circuit 5 as the input signal of the gray level mapping circuit 4 and the third selecting switch correspondingly contacts terminal B3 to select the output signal of the detail combining circuit 6 as the output brightness signal.

The method for enhancing image contrast of embodiment 2 considers other components, such as color saturation and scene switching. As showed in FIG. 6, the method begins at 200 performing scene detection and saturation detection. The method outputs the color saturation component parameter S and the scene detect signal $\gamma_i$ representing the continuity of the image to the statistic circuit of gray level distribution, the calculation circuit of adaptive contrast mapping curve, the inter-frame curve soft-merging circuit and the gray level mapping circuit.

Figure 6:
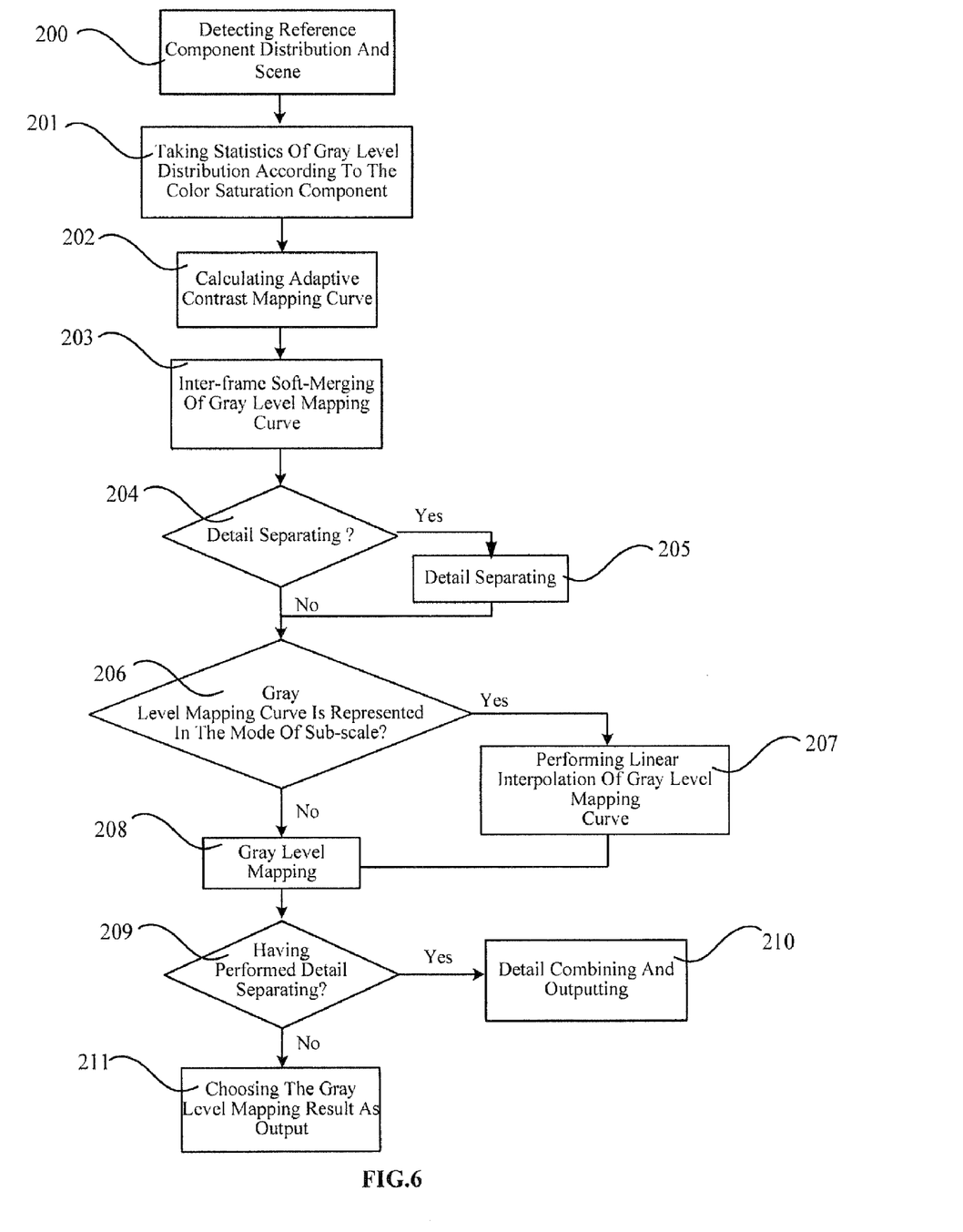
FIG. 6 is a flow chart of a method for enhancing image contrast.

At 201, the method takes, calculates, or otherwise generates gray level distribution statistics to the input brightness signal according to the color saturation component S and outputs the statistic data to the calculation circuit of the adaptive contrast mapping curve.

The method also takes into account the color saturation component level statistics. For example, the method may multiply a pixel with large saturation by an attenuation coefficient to decrease the contrast.

The gray level Y of the actual input brightness signal may in the range of [0,255]. An exemplary method of calculating gray level distribution statistics includes defining L=8 as the bit width of data, normalizing and obtaining the corresponding histogram distribution function f(n), n=0, 1, . . . , where N is the quantized histogram columns number, for instance N=64. The method then calculates the center of gravity of the gray distribution, e.g., the column $n_G$, and the first moment located at and the variance of the gray level distribution representing the dispreading of the distribution, e.g., the second moment $\sigma^2$.

Figure 7:
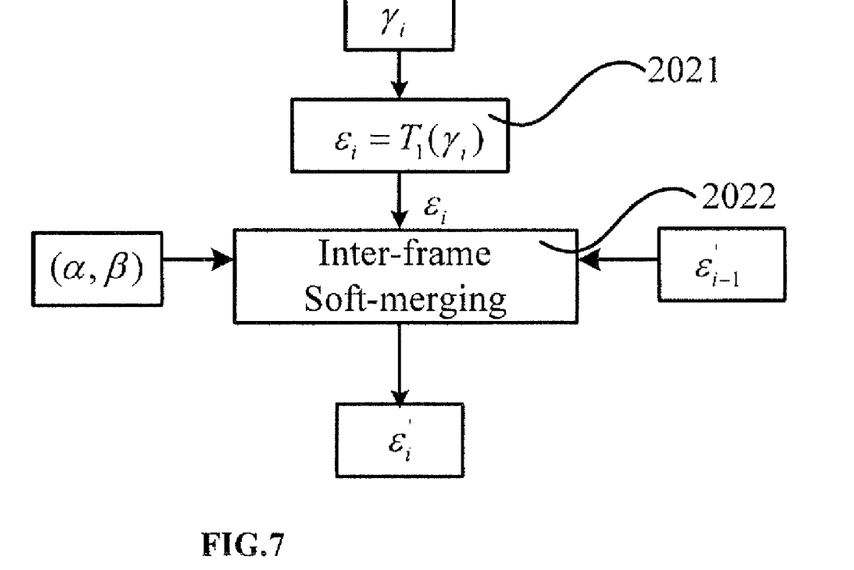
FIG. 7 is a block diagram of a scene switching gain soft-merging circuit.

At 202, the method adaptively and dynamically calculates the equivalent gray level mapping curve $H_A(n,i)$ of the image brightness signal based on the gray statistic data, multiplies $H_A(n,i)$ by the scene switching gain coefficient $\epsilon'_i$ and outputs the multiplication result as the gray level mapping curve of the current frame to the inter-frame curve soft-merging circuit;

The method for calculating $H_A(n,i)$ may be the same as described previously for embodiment 1 (e.g., step 102). The calculating scene switching gain coefficient $\epsilon'_i$ is shown in FIG. 7.

At 2021, the method calculates scene switching gain coefficient $\epsilon_i$ according to the scene detect signal $\gamma_i$ using for example, $\epsilon_i = K - \gamma_i$, where K is a constant larger than $\gamma_i$.

At 2022, the method performs inter-frame soft-merging to the scene switching gain coefficient $\gamma_i$ using, for example, $\epsilon'_i = (\alpha \cdot \epsilon_i + \beta \cdot \epsilon'_{i-1})/(\alpha+\beta)$.

Figure 8:
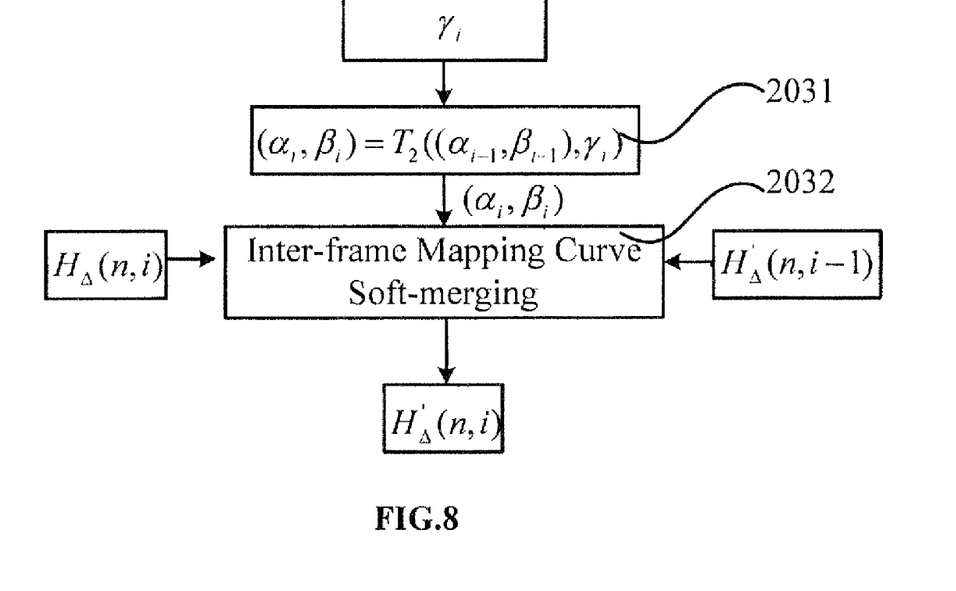
FIG. 8 is a block diagram of an inter-frame curve soft-merging circuit.

At 203, the method soft-merges the gray level mapping curve of the current frame and the soft-merging result of the previous frame stored in data buffer circuit referred to the scene detect signal $\gamma_i$. The method obtains the soft-merging result of the current frame, outputs the soft-merging result of the current frame to the gray level mapping circuit, and stores the result in the data buffer circuit;

An exemplary method for soft-merging to equivalent gray level curve referred to the scene detect signal $\gamma_i$ is shown in FIG. 8.

At 2031, the method calculates $(\alpha_i, \beta_i)$ from $\gamma_i$ and $(\alpha_{i-1}, \beta_{i-1})$ using for example, $$\alpha_i = \alpha_{i-1} - \tau$$
$$\beta_i = \beta_{i-1} + \tau,$$
where
$$\tau = \begin{cases} \gamma_i/\upsilon & \{a_{i-1} - (\gamma_i/\upsilon)\} > 0 \\ 0 & \text{otherwise} \end{cases}$$

and $\upsilon$ is a constant.

At 2032, the inter-frame curve soft-merging circuit performs inter-frame soft-merging to mapping curves as follows.

$$H_\Delta'(n,i) = \{\alpha_i \cdot H_\Delta(n,i) + \beta_i \cdot H'_\Delta(n,i-1)\}/(\alpha_i + \beta_i);$$

At 204, a user selects detail separating through the first selecting switch. If detail separating, the method moves to 205; Otherwise, the method moves to 206 where the second selecting switch 72 provides the image brightness signal as the input of gray level mapping circuit 4.

At 205, the method separates the detail signal from image brightness signal, outputs the detail signal to the detail combining circuit 6 and outputs the non-detail signal to the second selecting switch 72. The second selecting switch selects the non-detail signal as the input signal to the gray level mapping circuit 4 according to the first selecting switch 71.

At 206, the method determines whether the soft-merging result of the current frame is represented in the sub-scale mode. If so, the method moves to 207, else it is represented in an all-scale mode and the method moves to 208.

At 207, the method performs linear interpolation and smooth filtering and displaces the soft-merging result of the current frame by the processed result;

At 208, the method performs gray level mapping to the input signal based on the soft-merging result of the current frame and outputs the result of gray level mapping to the third selecting switch 73 and detail combining circuit 6.

Pixel saturation S is taken into account in the gray level mapping, for pixels with large saturation S, multiplied by an attenuation coefficient to reduce the adjustment of the signal to avoid risk, and the attenuation coefficient decreases as color saturation S increases.

At 209, the method determines whether the user elected detail separating. If so, the method moves to 210, the method moves to 211.

At 210, the method combines the result of gray level mapping with the detail signal, and selects the combined signal as the output brightness signal.

At 211, the method selects the gray level mapping result as the output brightness signal.

This exemplary embodiment adaptively and dynamically increases the contrast of the effective gray level based on the gray level distribution of serial images. This embodiment considers scene switching between of serial images and the characteristics of human vision in the soft-merging of gray level mapping curve to realize contrast enhancements that avoid undesirable image flicker.

It should be understood that the above embodiments are used only to explain, but not to limit the present. Despite a detailed description that refers to some embodiments, it should be understood that various modifications, changes, or equivalent replacements can be made by those skilled in the art without departing from the spirit and scope of the following claims.

We claim the following:

1. A device for enhancing image contrast, comprising:
a gray level distribution statistic circuit to calculate gray level statistic data of an image responsive to an image brightness signal;
an adaptive contrast mapping curve calculation circuit to calculate a gray level mapping curve responsive to the gray level statistic data;
an inter-frame curve soft-merging circuit to perform inter-frame soft-merging to the gray level mapping curve;
a gray level mapping circuit to perform gray level mapping of the input image brightness signal;
a first selecting switch with first and second positions, the first position to select providing the image brightness signal to the gray level mapping circuit;
a detail separating circuit to separate the input image brightness signal into a detail signal and a non-detail signal when the first selecting switch is in the second position;
a second selecting switch to provide the image brightness signal to the gray level mapping circuit when the first selecting switch is in the first position and to provide the non-detail signal to the gray level mapping circuit when the first selecting switch is in the second position;
a detail combining circuit to combine the detail signal with a signal output from the gray level mapping circuit; and
a third selecting switch to select the signal output from the gray level mapping circuit when the first selecting switch is in the first position and to select a signal output from the detail combining circuit when the first selecting switch is in the second position.

2. The device of claim 1 comprising:
a reference component distribution and scene detecting circuit coupled to the gray level distribution statistic circuit, the adaptive contrast mapping curve calculation circuit, the inter-frame curve soft-merging circuit, and the gray level mapping circuit, generate a reference component and a scene switching detect signal.

3. The device of claim 1 comprising:
a data buffer circuit to store a signal output from the inter-frame curve soft-merging circuit associated with a previous frame.

4. A method for enhancing image contrast comprising:
calculating gray level distribution statistics of a current frame of an image brightness signal;
calculating a gray level mapping curve of the current frame of the image brightness signal responsive to the gray level distribution statistics;
soft-merging the gray level mapping curve of the current frame of the image brightness signal with a stored signal representative of soft-merging the gray level mapping curve of a previous frame of the image brightness signal;
storing a signal resulting from the soft merging the gray level mapping curve of the current frame;
when a first selecting switch is in a first position, a second selecting switch is in a first position, and a third selecting switch is in a first position, mapping the gray level of the image brightness signal responsive to the soft-merging the gray level mapping curve of the current frame; and
when the first selecting switch is in a second position, the second selecting switch is in a second position, and the third selecting switch is in a second position,
separating the image brightness signal into a detail signal and a non-detail signal, mapping the gray level of the non-detail signal responsive to the soft-merging the gray level mapping curve of the current frame, and combining the detail signal with a signal resulting from gray level mapping the non-detail signal.

5. The method of claim 4 where calculating the gray level mapping curve includes:

calculating a scene switch gain coefficient; and multiplying the gray level mapping curve by the scene switch gain coefficient.

6. The method of claim 5 where calculating the scene switch gain coefficient includes adopting a soft-merging mode.

7. The method of claim 4 where soft-merging the gray level mapping curve includes calculating a weighted sum of the gray level mapping curve and the stored signal representative of soft-merging the gray level mapping curve of the previous frame.

8. The method of claim 7 where calculating the weighted sum occurs responsive to detecting a value of a scene switch.

9. The method of claim 4 here calculating the gray level mapping curve of the previous frame occurs in an all-scale mode.

10. The method of claim 4 where calculating the gray level mapping curve of the previous frame occurs in a sub-scale mode; and where mapping the gray level of the image brightness signal occurs after interpolating the signal resulting from the soft merging the gray level mapping curve of the current frame.

11. The method of claim 10 where interpolating includes at least one of linear interpolation and smooth filtering.

12. The method of claim 4 where calculating the gray level distribution statistics includes calculating the gray level distribution statistics of at least one of a whole or part of the current frame.

13. The method of claim 4 further comprising: outputting the gray level mapped image brightness signal as an output brightness signal when the selecting switches are in the first position; and outputting the combination of the detail signal and gray level mapped non-detail image brightness signal as the output brightness signal when the selecting switches are in the second position.

* * * * *